US007457313B2

(12) United States Patent
Patrick

(10) Patent No.: US 7,457,313 B2
(45) Date of Patent: Nov. 25, 2008

(54) HIERARCHICAL PRIORITIZED ROUND ROBIN (HPRR) SCHEDULING

(75) Inventor: Michael W. Patrick, Assonet, MA (US)

(73) Assignee: General Instrument Corporation, Horsham, PA (US)

(*) Notice: Subject to any disclaimer, the term of this patent is extended or adjusted under 35 U.S.C. 154(b) by 517 days.

(21) Appl. No.: 11/013,226

(22) Filed: Dec. 15, 2004

(65) Prior Publication Data

US 2005/0175014 A1    Aug. 11, 2005

(51) Int. Cl.
*H04J 3/16*    (2006.01)
*H04J 3/22*    (2006.01)
(52) U.S. Cl. .................... 370/468; 370/412
(58) Field of Classification Search .............. None
See application file for complete search history.

(56) References Cited

U.S. PATENT DOCUMENTS

| 5,050,161 | A | | 9/1991 | Golestani |
| 5,463,620 | A | | 10/1995 | Sriram |
| 5,748,629 | A | | 5/1998 | Caldara et al. |
| 5,781,624 | A | | 7/1998 | Mitra et al. |
| 6,094,435 | A | * | 7/2000 | Hoffman et al. ............ 370/414 |
| 6,477,144 | B1 | * | 11/2002 | Morris et al. ............ 370/230.1 |
| 6,560,195 | B1 | | 5/2003 | Basak et al. |
| 6,608,816 | B1 | | 8/2003 | Nichols |
| 6,647,424 | B1 | | 11/2003 | Pearson et al. |
| 6,654,374 | B1 | * | 11/2003 | Fawaz et al. ............. 370/394 |
| 6,721,325 | B1 | * | 4/2004 | Duckering et al. ......... 370/395.4 |
| 6,891,835 | B2 | * | 5/2005 | Kalkunte et al. ......... 370/395.41 |
| 2006/0007859 | A1 | * | 1/2006 | Kadambi et al. ............ 370/229 |

FOREIGN PATENT DOCUMENTS

EP    0 790 726 A2    8/1997

OTHER PUBLICATIONS

Shreedhar M. et al., "Efficient Fair Queuing Using Deficit Round Robin", Computer Communication Review, ACM, New York, NY, US, vol. 25, No. 4, Oct. 1, 1995, pp. 231-242, XP000541659, ISSN: 0146-4833.

(Continued)

*Primary Examiner*—Ajit G Patel
(74) *Attorney, Agent, or Firm*—Stewart M. Wiener

(57) ABSTRACT

The HPRR method uses "token bucket" rate classifiers to mark each individual packet as conforming or not conforming to a traffic specification for the flow. Flows are considered to be in a single service class. One such class is distinguished as a default "best effort" service class. Each service class is assigned a weight corresponding to its fraction of bandwidth granted to the class when all classes are active. The HPRR method allows a packet from a flow to be forwarded in one of two ways, either as part of its class's allocated bandwidth or as part of the "best effort" bandwidth. By always providing two paths for a flow to send its packets, a flow is always given its "fair share" of two different classes: its primary or configured class and the best effort class. An overbooked class will have each of its flows compete for the inadequate bandwidth allocated to the class, but because each flow can use the best effort bandwidth it also gets a fair share of that bandwidth to allow the classes bandwidth guarantees to be when other classes are inactive.

3 Claims, 9 Drawing Sheets

OTHER PUBLICATIONS

MacGregor M.H. et al., "Deficits for bursty latency-critical flows: DRR++" Networks, 2000 (ICON 2000) Proceedings, IEEE International Conference On Sep. 5-8, 2000, Piscataway, NJ, USA, IEEE, Sep. 5, 2000, pp. 287-293, XP010514114, ISBN: 0-7695-0777-8.

* cited by examiner ial application Ser. No. 60/156,123 entitled, "Hierarchical Prioritized Round Robin (HPRR) Scheduling" filed Sep. 25, 1999 by the present applicant.

HIERARCHICAL PRIORITIZED ROUND ROBIN (HPRR) SCHEDULING

CROSS-REFERENCE TO RELATED APPLICATIONS

This application claims priority of U.S. provisional application Ser. No. 60/156,123 entitled, "Hierarchical Prioritized Round Robin (HPRR) Scheduling" filed Sep. 25, 1999 by the present applicant.

FIELD OF THE INVENTION

This invention relates generally to computer networks and more particularly to scheduling data traffic onto a data transmission link.

BACKGROUND OF THE INVENTION

One requirement for link-sharing is to share bandwidth on a link between multiple organizations, where each organization wants to receive a guaranteed share of the link bandwidth during congestion, but where bandwidth that is not being used by one organization should be available to other organizations sharing the link. Examples range from the multiple agencies that share the Trans-Atlantic FAT pipe and each pay a fixed share of the costs to individuals who share a single ISDN line. Another example of link-sharing is the shared bandwidth on a link between different protocol families (e.g. IP and SNA), where controlled link-sharing is desired because the different protocol families have different responses to congestion. A third example of link-sharing is to share bandwidth on a link between different traffic types, such as telnet, ftp, or real-time audio and video.

The control of network resources involves local decisions on usage as well as considerations of per-connection end-to-end requirements. One function of link-sharing mechanisms is to enable gateways to control the distribution of bandwidth on local links in response to purely local needs.

The need to carry different traffic types including real-time services on the shared links results in a need for hierarchical link sharing having classes of traffic. Link-sharing services and real-time services involve simultaneous sets of constraints to be satisfied at the gateway. There is also a need to prevent starvation of lower-priority traffic while satisfying the needs of higher-priority traffic while meeting link-sharing requirements.

Current scheduling methods support differentiated Quality of Service (QOS) using variations on prioritized Class Based Queuing (CBQ) or a Weighted Fair Queuing (WFQ) approach. Prior art CBQ and WFQ methods ignore two important factors: 1) overlimit traffic, i.e. traffic from a flow that exceeds the flow's committed traffic rate specification, and 2) deliberate "overbooking" of flows in order to provide statistical rather than guaranteed assurance of bandwidth and delays. Overbooking of flows means that flows with reserved minimum bandwidth requirements are admitted even though there is insufficient capacity to provide that bandwidth when all flows are simultaneously active.

The CBQ algorithm depends on a fixed set of flows that are always considered active, rather than an environment of rapidly changing active flows. The CBQ algorithm uses a slow-acting "average" rate per flow to classify it as overlimit. The CBQ algorithm is relatively slow acting, because it relies on a calculated average rate of a class to determine whether the class is above or below a traffic limit. It depends on calculation of relatively slow-acting average rate per flow (or class) to mark the class "overlimit" and then on a relatively complicated algorithm for determining what the "fair" bandwidth allocation to an overlimit class should be. Finally, it makes no provisions for "overbooking" of flows in a class, i.e. where flows with guaranteed minimum service rates are deliberately over-admitted, in the hope that statistically few admitted flows will be simultaneously backlogged. The CBQ algorithm does not discuss class bandwidth enforcement in the presence of overbooking.

With the CBQ algorithm, each class can be limited to its assigned average bandwidth, but there are no protections to the instantaneous loss of bandwidth to underlimit classes. This is because the CBQ algorithm as described relies on the relatively slow-changing average rate to determine whether a class is overlimit or not.

Single-level WFQ methods suffer from the problem of overbooking, because an overbooked set of flows can obtain an arbitrarily large fraction of bandwidth. Each flow consumes its "fair share" even if there are too many of them. The overbooking problem is alleviated with the concept of a hierarchy of WFQ schedulers. The WFQ algorithms, however, assume that each flow obeys its traffic specification, and the algorithm described makes no provision for individual flows that are over the traffic specification limit. There is no concept in the hierarchical WFQ method for a flow in one class to "share" the bandwidth with a best effort class. If one flow of a higher level is overlimit, it must content itself with the bandwidth allocated to its class, and cannot compete with other best-effort flows in the default class. For example, consider a case where there are 5 flows in a "guaranteed" class, each of which is assigned 10% of the bandwidth and only 1 flow in the default class, which is also allocated 50% of bandwidth. The one default flow is continuously backlogged and so is getting 50% of bandwidth. If one of the guaranteed flows suddenly bursts to need as much bandwidth as it can get, it will continue to receive only 10% of the link bandwidth, i.e. ⅕ of the 50% assigned to the guaranteed class using hierarchical WFQ.

In a WFQ scheduling algorithm, overbooked flows will continue to use their weight's worth of bandwidth, and indeed with sufficient overbooking can consume arbitrarily large fractions of the bandwidth. The WFQ algorithm makes no provision for a "class" of flows to be limited to a percentage of bandwidth, and for that bandwidth to be enforced even in the presence of overbooking. Overbooking is an important economic requirement for commercial bandwidth providers. The WFQ algorithm, while providing better worst case delays than a Deficit Round Robin (DRR) algorithm, also has several computational complexities. The chief problems are a divide operation to calculate the "finish time" of a packet, and the complexity in maintaining an ordered queue based on finish time. These complexities are generally considered to be on the order of O(log N) for N possible flows.

SUMMARY OF THE INVENTION

The problems of scheduling packets to a data transmission link are solved by the present invention of hierarchical prioritized round robin scheduling.

An important component for providing differentiated Quality of Service (QOS) in a data networking device is the scheduling method for packets routed to an outgoing transmission interface. The present invention is a method for scheduling packets on a transmission interface that provides for assigned bandwidth to different classes of traffic, where each class consists of a number of flows. It provides for efficient and fair handling of overbooked flows, i.e. where the admitted flows have a sum of traffic rates that exceed the assigned capacity for the flows' classes. The present invention includes an enhancement to the Deficit Round Robin (DRR) algorithm to provide for prioritized forwarding of packets with the concept of a priority for each class, while maintaining the DRR mechanisms for limiting each class' bandwidth to an assigned fraction of capacity. A key aspect of the invention is the identification of one class as the "default" class, where flows that exceed their class's traffic rate may still forward packets in the default class's assigned bandwidth.

With HPRR, the former example's bursting guaranteed class flow will get its 10% guaranteed fraction plus ½ of the best effort bandwidth (25%), for a total of 35% of bandwidth. The HPRR method efficiently and easily allocates default or best effort bandwidth to any differentiated class flows that are over their traffic specification limit.

The HPRR method uses immediately accurate "token bucket" rate classifiers to mark each individual packet as conforming or not conforming to a traffic specification for the flow. The key to this invention is that flows are considered to be part of two different classes: the flow's assigned class and the "default", or best effort class. The HPRR method allows a packet from a flow to be forwarded in one of two ways, either as part of its class's allocated bandwidth or as part of the "best effort" bandwidth. Unlike CBQ, the HPRR method does not attempt to mark classes as "overlimit" or not, nor to determine whether or not overlimit classes are permitted to block or forward their packets. There is no need to process any algorithm that examines the over or under-limit status of all peer classes. Instead, by always providing two paths for a flow to send its packets, a flow is always given its "fair share" of two different classes: its primary or configured class and the best effort class.

The HPRR method is a simple and effective algorithm for handling overbooked classes. An overbooked class will have each of its flows compete for the inadequate bandwidth allocated to the class, but because each flow can use the best effort bandwidth it also gets a fair share of that bandwidth to allow the classes bandwidth guarantees to be when other classes are inactive.

The HPRR method determines on a packet-by-packet basis whether the packet itself conforms to a traffic rate token bucket. Held packets that are not conforming to the flow's Traffic Spec token bucket are ineligible for forwarding via the flow's class bandwidth, but are still eligible for forwarding via the default class bandwidth. The HPRR method, by using novel "prioritized" DRR method, avoids the divide operations and O(log N) maintenance of an ordered queue, at the admitted cost of higher worst-case delay bounds.

Definitions:

General scheduler: schedules packets from leaf classes without regard to link-sharing guidelines.

Link-sharing scheduler: schedules packets from some leaf classes that have been exceeding the link-sharing allocations in times of congestion.

Regulated class: if packets from that class are being scheduled by the link-sharing scheduler at the gateway.

Unregulated class: if traffic from that class is being scheduled by the general scheduler.

Overlimit, underlimit, at-limit: A class is called overlimit if it has recently used more than its allocated link-sharing bandwidth (in bytes/sec, as averaged over a specified time interval); underlimit if it has used less than a specified fraction of its link-sharing bandwidth, and at-limit otherwise.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
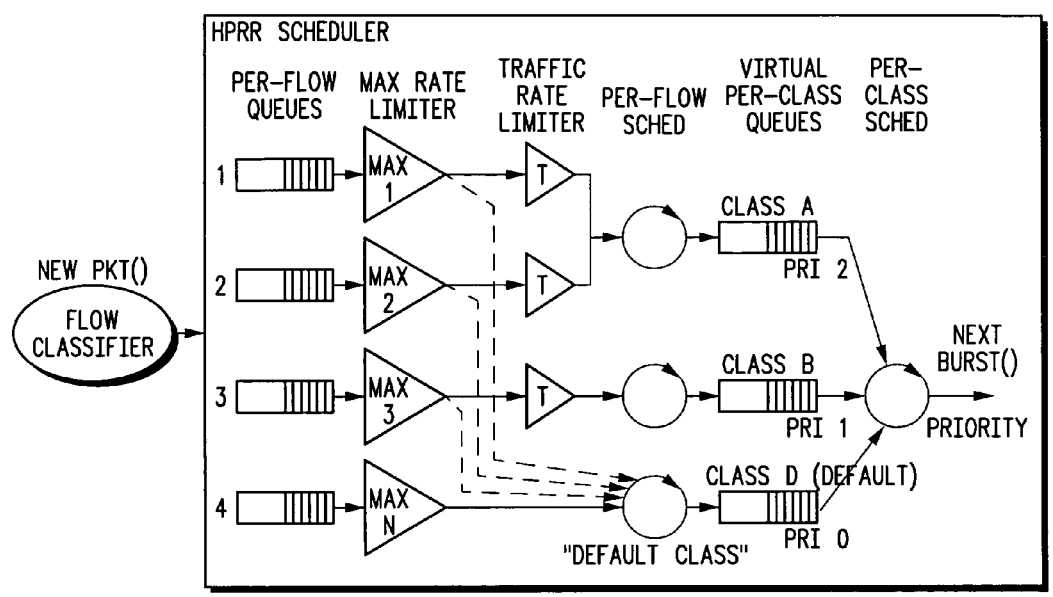
FIG. 1 is a part-schematic flow diagram of hierarchical prioritized round robin (HPRR) scheduling according to principles of the invention.

FIG. 1 is a part-schematic flow diagram of a hierarchical prioritized round robin scheduling method according to principles of the invention. The present invention discloses a method and apparatus for scheduling the transmission of packets onto a data transmission link. Packets intended to be transmitted on a transmission link are given to a scheduler, which enqueues the packets and reorders the packets if necessary to meet pre-determined criteria.

The scheduling method and apparatus (referred to as the "scheduler") herein described involves a combination of per-flow queuing with a prioritized service that limits both the maximum burst at each priority level as well as the bandwidth fraction on a per-priority level basis. The present invention combines key aspects of both Weighted Fair Queuing (WFQ) and Class Based Queuing (CBQ) packet scheduling methods. Further, an improved Deficit Round Robin service method is included in the present scheduling method and apparatus. The improved Deficit Round Robin service method avoids the complexity of prioritized enqueuing and the divide operations of WFQ finish time calculation.

Referring now to FIG. 1, the scheduler of the present invention processes packets in a number of stages within the scheduler.

1. Packets are first classified into "flows." For the Internet Protocol (IP), the flow classification is advantageously a function of the packet's source and destination IP addresses, the IP protocol type, and the User Datagram Protocol (UDP) or Transmission Control Protocol (TCP) port number in the packet. In the scheduler, packets are first enqueued on a per-flow queue. Each flow advantageously has a maximum number of buffers that may be queued on it. As an example of flow classification, packets for IP telephony (i.e. encapsulated voice) may be classified as flow number 1, while all other packets are classified as flow number 4 (the default flow class).

Each flow is considered to be a member of a single "service class," which describes a set of data forwarding services provided to flows.

2. Packets then must pass a Maximum Rate token bucket limiter, which limits the forwarding rate on a per-flow basis. Once packets have passed their Maximum Rate limiter, they are eligible for forwarding in either of two classes: the flow's configured class or the default class.

3. Packets must then pass a Traffic Rate token bucket limiter in order to be eligible for forwarding to their logical per-class queue. The "Traffic Rate" is the maximum rate at which flow's source agrees to inject traffic into the network. The service contract between the network and the traffic source is such that only packets transmitted at less than the traffic rate will receive differentiated service by the network. For a Committed Information rate (CIR) service such as provided in Frame Relay networks, the Traffic Rate corresponds to the CIR rate. It is desirable for the network to accept packets at a faster then Traffic rate, but to forward them on only a best effort basis. With the scheduler of a preferred embodiment of the present invention, packets arriving faster than the Traffic Rate are being prohibited from being forwarded as part of the bandwidth allocated to their service class, and may be forwarded only as part of the bandwidth allocated to the default class.

4. At any instant, a class may be instantaneously overbooked, which means that the admission control algorithm permitted flows with traffic rates to be admitted that exceeded the configured capacity of the transmission channel allocated to the class. In this condition, the scheduler permits flows to forward packets using the default class bandwidth in addition to their class's bandwidth.

5. Packets passing the Traffic Rate Limiter are scheduled onto a per-class queue which holds the packets for all flows in the same class.

Packets are physically enqueued only on a per-flow queue. The per-class queues of FIG. 1 are "virtual" queues used for describing the operation of the method of the present invention. Also, all packets which conform to a flow's Maximum Rate token bucket limiter are eligible for forwarding from both the class's bandwidth and the default class bandwidth.

The actual per-flow queues conceptually feed a per-class queue for the flows' assigned service classes. The manner in which packets from flows in the same class are forwarded to the per-class queue is independent of the present invention, but is preferably a type of fair queuing algorithm, such as Deficit Round Robin scheduling.

Each flow is configured with a maximum rate limiter in the scheduler, so that it will not forward a packet if doing so would exceed the maximum rate configured for the flow. Buffer management is performed on a per-flow basis, not a per-class basis.

Each flow also has a Traffic Rate Limiter that prevents it from forwarding packets that exceed the flow's Traffic Rate onto its service class queue. Each flow must be configured with a Traffic Rate Limiter to which it must conform in order to receive the bandwidth assigned to its flow class. A flow is permitted to send data faster than the traffic rate, but it is kept back on the per-flow queue and may be forwarded only as part of the bandwidth allocated to the default class.

The scheduler forwards packets from the flow queues to a "virtual" queue for the service class of the flow. This is a virtual queue because it is not necessary to implement a physical queue (e.g. a linked list) for the per-class queue. Instead, the scheduler needs only to keep a pointer to the "top" flow queue on the per-class list. When the top packet or packets from the "virtual" priority queue are dequeued, they are removed from the (actual) flow queue, and the next "top" of the class queue is determined by scanning the active flow queues in that class. It is desirable that the scheduler not forward packets in any single queue out of order.

Each service class is assigned a scheduling priority. The per-class queues are serviced in priority order, subject to bandwidth limits. Advantageously, the Deficit Round Robin (DRR) algorithm may be used to schedule packets from each class. The present invention includes an enhancement to the DRR algorithm in order to implement prioritized scheduling. The highest priority class queue is serviced until its quantum runs out, at which time the next higher priority class is scanned. When all classes have "run out" of their quantum, a new DRR round is started.

A class's quantum for its priority DRR algorithm is calculated by the scheduler based on a Maximum Assigned Bandwidth (MAB) configured for the class. The MAB is conveniently expressed in units of integer percentage points in the range of 1 to 100 although some other measure may be used within the scope of the present invention.

The MABs assigned to a class determine its quantum for DRR purposes, so that the ratio of quanta for each class equal the ratio of MABs for each class. One algorithm for computing the quantum from a MAB is described here. The class with the highest MAB is given the maximum quantum which is the maximum packet size permitted in the system. For the IP routing protocol, a reasonable maximum is a figure of 1600 bytes, which exceeds the IP Maximum Transmission Unit (MTU) for Ethernet Local Area Networks (LANs). Other classes are assigned a quantum based on the ratio of their MAB to the highest MAB. For example, suppose the highest MAB is 50%, and it is assigned a class quantum of 1600. A class with an MAB of 10%, receives a quantum of 10/50*1600, or 320 bytes. Using this quantum assignment algorithm, the dynamic range of reserved rates must be limited to 1500 to 1. Ideally, the dynamic range should be limited to about 100 to 1, in order to limit the number of rounds required to accumulate a 1600 byte deficit.

An important concept for the scheduler of the present invention is that all nonzero priority flows are scanned twice: once by their priority queue scheduler, and once by the Best Effort (BE) priority level 0 DRR scheduler. The purpose of this is to grant bandwidth to prioritized flows even for the best effort bandwidth. For example, consider 5 prioritized flows with the 10 kbps traffic rates and 1 best effort flow sharing a 500 kbps channel. The prioritized flows reserve only 50 kbps of the 500 kbps available, but they need some mechanism for sharing the 450 kbps left for the best effort. Scanning the flows twice as described above achieves this purpose.

A flow's actual bandwidth received during an "epoch" of continuously backlogged flows is the sum of two rates:
1. The flow's advertised Traffic Rate, which is transmitted at the flow's class's priority level; and
2. the flow's share of the remaining "best effort" capacity.

In IP networking, it is expected that most identified flows will be bursty, and most flows will be idle at any given instant. The "service share" of any given flow is not its quantum divided by the sum of all assigned flow's quanta, but its quantum divided by the sum of the active flows' quanta. The term "allocated" refers to a flow that is assigned to a channel when spectrum management assigns a modem to a particular RF channel. The flow is considered "active" only when it has packets enqueued on its per-flow queue (i.e. it is backlogged) or it has a packet actually being transmitted.

For example, suppose here are 100 flows at the best effort or priority 0 level assigned to a channel. Each is given a flow quantum of 1500 bytes. Over a given congested period (i.e. where at least one packet was enqueued), only 10 of the modems transmitted any data. Since only 10 modems were active, the sum of the active quanta was 15000, and each modem received an opportunity to transmit 1500/15000 of the bandwidth, or 10%, of the bandwidth made available for priority 0 (lowest) traffic.

The operation of the present invention scheduler in the event of overbooking is important. Overbooking occurs when the traffic rate of flows admitted to a transmission link exceeds the assigned capacity of the link assigned to the flows' class. Each class is separately scheduled, and no class is permitted to exceed its average rate (as determined by the quantum assignments when DRR is used at the per-class scheduling level). In an alternative embodiment of the present invention, the per-class scheduling step could also use WFQ, in which case each class is also blocked from using more than its assigned share of bandwidth.

The modified Deficit Round Robin method of the present invention provides prioritized forwarding. The prioritized DRR method is advantageously used as the last "per-class" scheduling stage of the scheduler of the present invention. Prior art DRR depends on the concept of a quantum assigned for each scheduled class, and visits each class in a round robin manner. In the present invention, each class is assigned a priority. The prioritized DRR method of the present invention visits each class in order of priority, with no order specified for classes at the same priority. The highest priority class is serviced until it either forwards all packets on its per-class queue or it exhausts its "deficit" count. At that point, the next highest priority class is serviced. When all classes have either emptied their per-class queue or exhausted their deficit, a new DRR round is started, i.e. all backlogged classes are given a new quantum. As with the DRR algorithm, the ratio of the quantum assignments determines the long-term ratio of transmission link bandwidth assigned to the class.

In a preferred embodiment of the present invention, flows are admitted to a transmission channel based on a configured level of overbooking. One approach is to configure the assumed percent active flows in a service class. For example, if only 10% of the flows were expected to be simultaneously active, the Configured Active Percent (CAP) configuration for this case would be 10%.

Each flow would have an identified "Traffic Specification" which gives a traffic rate and traffic burst parameters for a traffic rate token bucket. Packets from the flow are determined to be either conformant or non-conformant to the traffic specification. Each class would have a "minimum reserved bandwidth" associated with it. This is analogous to the committed information rate of frame relay networks of the minimum cell rate for ATM networks. The minimum reserved rate is used as the Traffic Specification for the Traffic Rate token bucket of the method of the present invention.

The overbooking admission control method, then, is to admit flows such that the CAP percentage times the sum of the admitted flows' reserved rates is less than the MAB percentage allocated for the class on the channel. For example, if the CAP is set to 10%, a class is configured with an MAB of 50% of a 1 Mbps channel, and the class has a reserved traffic rate of 100 Kbps, then the number of the admitted flow is:

Number of admitted flows=(*MAB**capacity)/
  *CAP**reserved bandwidth)=0.50*1,000,000/
  (0.10*100,000)=50 admitted flows.

When flows are admitted in an overbooked situation, it is possible that more than the CAP expected number of active flows are actually active. The scheduling method of the present invention divides the configured capacity for the class evenly among all of the overbooked admitted flows so that each will receive less than its "committed" rate of bandwidth, and also such that no other class is affected. All flows are allowed to use the best effort bandwidth, however, if other best effort flows are inactive, it is still possible that the flows will receive their committed bandwidth. Still, it is advantageous to report the number of packets that arrived into the system to find an "overbooked" situation for their class, i.e. when more than the CAP configured active percent of flows were simultaneously backlogged. This gives guidance on how to set the CAP parameter, and can be used as the basis of a service level agreement.

By varying the traffic specification and admission policy, the major QOS service schemes can be implemented using the present invention.

A "guaranteed" service can be provided with a class that has the highest priority with a nonzero traffic bucket and zero overbooking (i.e. a CAP of 100% simultaneously active). This combination can guarantee minimum delays and maximum bandwidths.

A "committed information rate" CIR service class can be implemented with a nonzero traffic rate, a priority less than the guaranteed class, and with permitted overbooking. By permitting overbooking, the bursty traffic of typical data communications can receive a statistically guaranteed service while maintaining a high link utilization.

A "prioritized best effort" service class can be provided with an unlimited traffic rate bucket and unlimited overbooking (CAP=0), with a class priority that is lower than the CIR class but better than the "default" service class.

The "default" service class should have an unlimited traffic rate bucket, unlimited overbooking, and a priority lower than the Prioritized Best Effort class above.

A "bulk" or "low priority" service class would have an unlimited traffic rate and unlimited overbooking, and would have a priority level lower than the default class.

Figure 2:
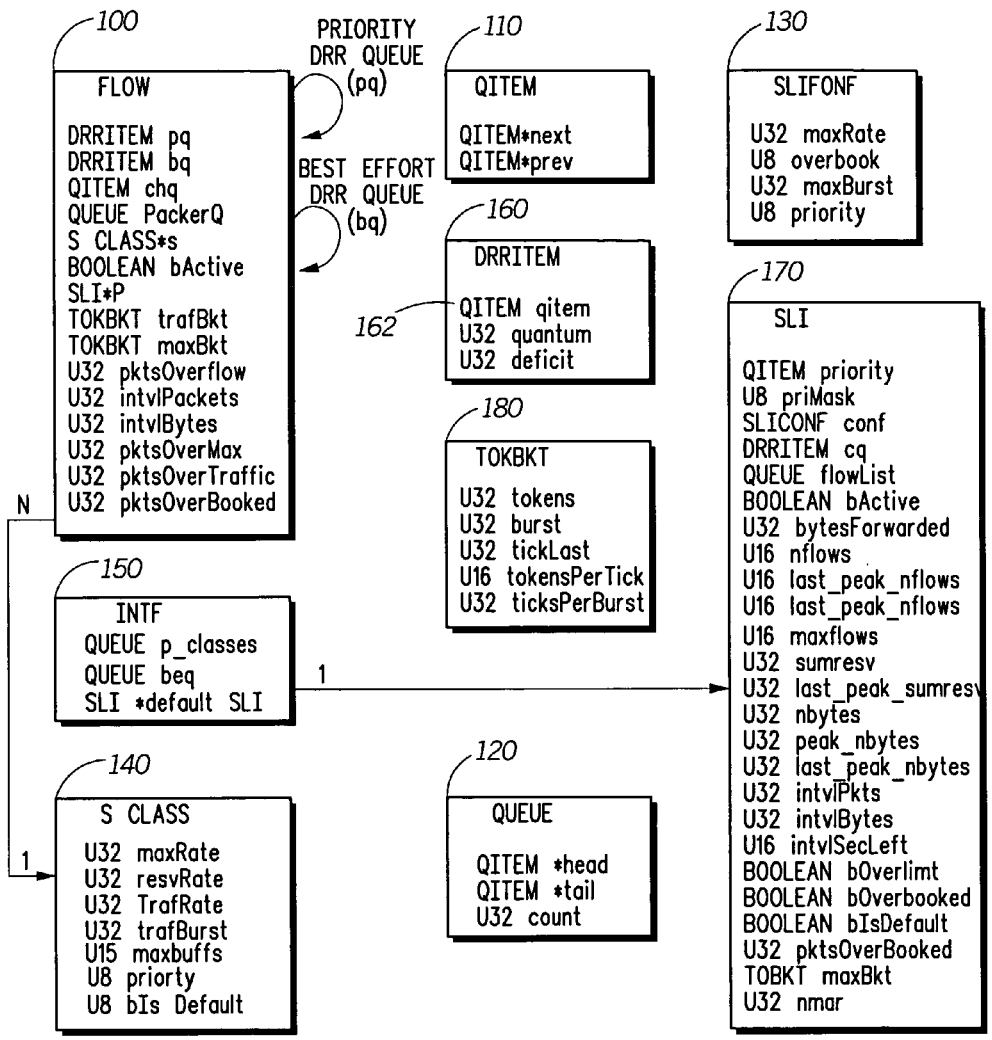
FIG. 2 is a block diagram of data structures used by the HPRR method and system of FIG. 1.

FIG. 2 shows key data structures used in the described embodiment of the present invention. The FLOW structure 100 contains all information associated with a single flow of packets. Each flow contains a queue structure named PacketQ which contains pointers to the beginning and end of a queue of packets to be transmitted.

The QITEM structure 110 allows structures which contain it to be linked in a doubly-linked list. The QUEUE structure 120 contains pointers to the head and tail QITEMS of a given list, along with the count of items in that list.

A SLICONF structure 130 contains parameters that are considered to be configured for the operation of a particular Service Class SCLASS 140 when it operates on a particular Interface Intf 150. It contains a parameter overbook, for instance, that indicates what multiple of actual bandwidth may be overbooked by admitted flows to the interface with reserved rates in excess of capacity.

The DRRITEM structures 160 contains the parameters needed to schedule a flow (or service class) using the Deficit Round Robin (DRR) algorithm. The DRR algorithm operates by initially assigning each item a fixed quantum. Flows are allocated bandwidth according to the relative ratio of their quantum assignments. The quantum assignments are fixed for each flow, and determined at the time the flow is created.

A quantum for a flow is stored in the U32 quantum field 162 of the DRRITEM. At any given time, a flow is allowed to transmit a quantity of bytes stored in the deficit count of its DRRITEM. At the start of each DRR "round" of a DRR queue, all DRRITEMS in that queue increment their deficit count by the amount in their quantum. As each DRRITEM is processed (by the Next Burst method described in relation to FIGS. 6-10), its deficit value is compared against the number of bytes to be sent by the next packet for that flow. If there is an insufficient count of bytes in the deficit count, the flow is moved to the end of its DRR queue to await the next DRR "round" at which time its deficit will be incremented. If there are sufficient bytes in deficit, the packet is sent and the deficit count is decreased by the number of bytes sent. Over the long run, the DRR algorithm offers bandwidth fairly to all flows within a DRR queue, based on the ratio of their quantum assignments. It is much fairer than the usual "first come, first served" (FCFS) service of a single transmit queue, because flows with fewer and smaller packets are not forced to wait behind the packets of flows with many and larger packets.

A Service Level Interface (SLI) structure 170 controls the scheduling and contains statistics of the operation of a single Service Class (SCLASS) operating on a single Interface (Intf). The scheduling method of this invention calls for logically offering fractions of bandwidth of an interface to each SLI according to a configured weight for the SLI. Within that allocated bandwidth, the embodiment offers equal-weighted fractions to all active flows within the same Service Class.

The SLIs are considered to be ordered in terms of the priority field of the Service Class (SCLASS 140). The "p_classes" field of the INTF structure 150 heads a linked list of SLI structures 170, and are linked through the QITEM structure 110 named "priority" that is in the SLI.

The present invention uses three separate DRR queues:

Flow Priority DRR Queue: Flow structures 100 contain a DRRITEM 160 called "pq" which links all of the flows belonging to the same service class (and hence at the same priority level). The head and tail of this queue is the QUEUE structure 120 named "flowlist" within the SLI structure 170.

Flow Best Effort DRR Queue: Flow structures 100 contain a DRRITEM 160 called "bq" which links all of the active flows on an interface. An Interface structure Intf 150 contains a QUEUE structure 120 that provides the head and tail of this linked list of flows.

Class DRR Queue: Service Level Interface (SLI) structures 170 that are active on an interface are considered to be part of a DRR queue of the SLIs themselves. The DRRITEM 160 for this "Class" level of scheduling is stored in the "cq" object of an SLI 170.

The TOKBKT structure 180 describes both the traffic rate token bucket used to determine when flows are permitted to use their service classes bandwidth, as well as the maximum rate token bucket used to hold flow packets on their flow queue when they arrive faster than the flows maximum permitted forwarding rate.

Figure 3:
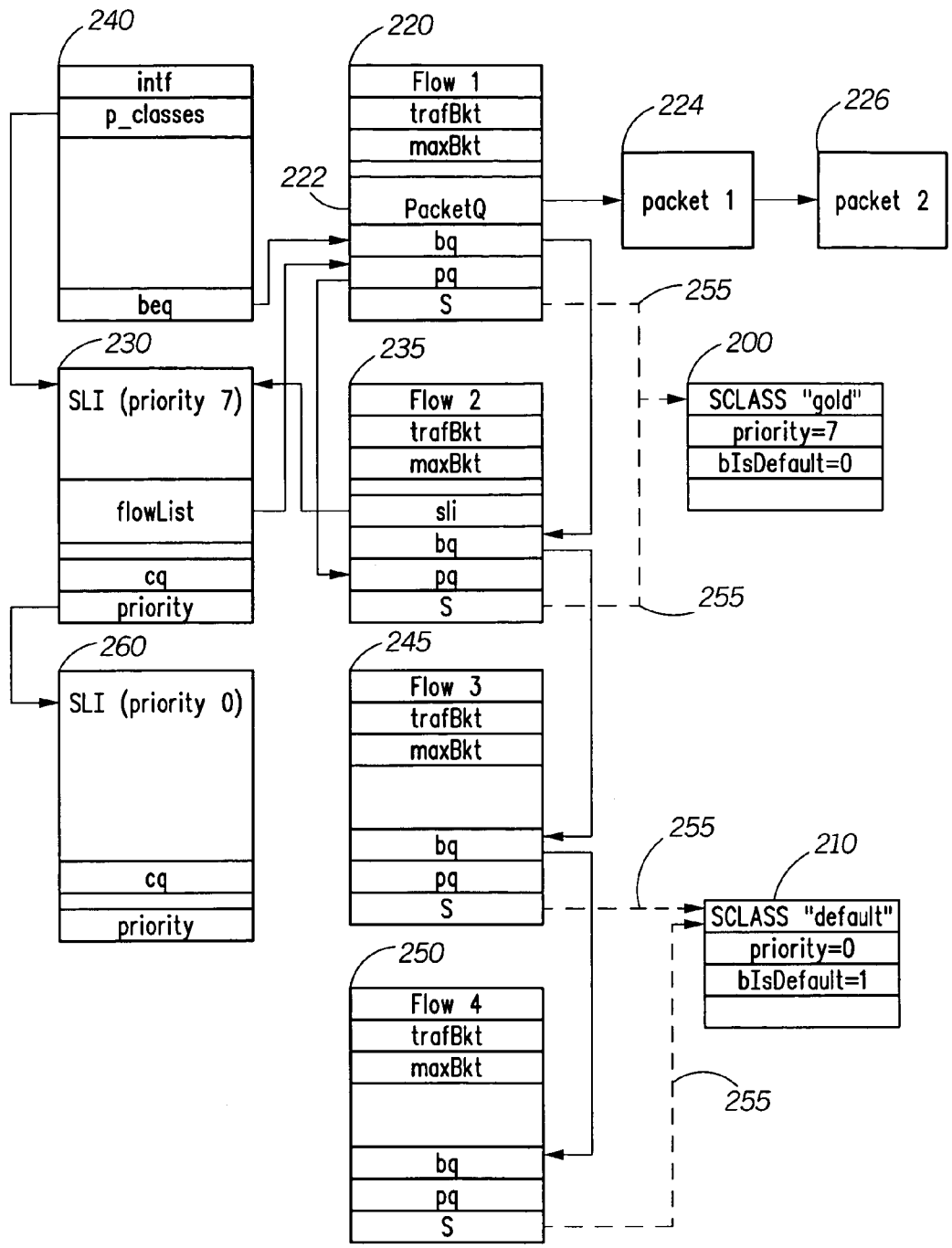
FIG. 3 is a block diagram of an example state of the data structures of FIG. 2.

FIG. 3 shows an example state of the structures of FIG. 2. Only relevant fields of the structures are shown. For a particular transmission interface of a data communications device, a single Intf structure contains the QUEUE structure that heads a linked list of SLIs in decreasing priority order. In the example, there are two service classes: "gold," the SCLASS="gold" structure 200, and "default," the SCLASS="default" structure 210 for the "default" service class, structure 260. There is always an SLI for the "default" service class.

1. Flow 1 220 is one of two active flows in the "gold" SCLASS. Like all active flows, it has a QUEUE structure named PacketQ 222 that heads a linked list of packets 224, 226 to send on the flow. The scheduling method of this invention always sends packets from the same flow in order. In FIG. 3, only Flow 1 is shown to have packets on its PacketQ, but in the example all active flows are considered to have such packets. The PacketQ and packets are not shown in the other flows for brevity.

Flow 1 220 is considered to be on two DRR queues. The Flow Priority Queue is headed by the QUEUE structure named "FlowList" within the SLI 230 for the "gold" class on this interface. The DRRITEM named "pq" within Flow 1 contains a link to the other FLOW on the SLIs FlowList, Flow 2 235. Flow 1 is also considered to be on the "Best Effort" DRR Queue, which is headed by the QUEUE structure named "beq" within the Intf interface structure 240. All of the flows on the Best Effort DRR Queue are linked via the DRRITEM named "bq" within the Flow structure. Notice that all Flows of FIG. 3 (220, 235, 245, 250) are on the linked list headed by Intf.beq (240) and linked via their "bq" DRRITEM structures.

2. Flow 2 235 is another flow within the "gold" service class that is active along with Flow 1. The term "active" when applied to a flow or an SLI means that it has a packet waiting to be transmitted.

3. Flow 3 245 is a "best effort" flow. Although they are not shown, it includes a PacketQ with packets to send, and an "sli" pointer that points back to the SLI for the operation of the "default" service class (which is not shown). Flow 3 does not use its "pq" DRRITEM; it is considered to be only on the "Best Effort" DRR queue, which uses the "bq" DRRITEM.

4. Flow 4 250 is similar to Flow 3 245. It is a Best Effort flow that is scheduled bandwidth only under the "default" service class.

Each flow has a pointer named "S" 255 that points to the Service Class (SCLASS) structure on which they are classified. All flows must be considered to be within one class. The "default" class contains flows that are not otherwise classified.

The flows that are considered to belong to the default service class 210 (Flow 3 245 and Flow 4 250) are not linked via their "pq" DRRITEM. Instead, when the default class SLI is offered bandwidth by the NextBurst procedure, the flows on it are obtained from the "beq" list off of the Intf structure 240, rather than the "flowlist" QUEUE the default class SLI 260.

All flows also contain a pointer "sli" that points back to the SLI structure that controls their operation on an interface. In FIG. 3, only the "sli" back pointer for Flow 2 235 is shown for clarity.

Figure 4:
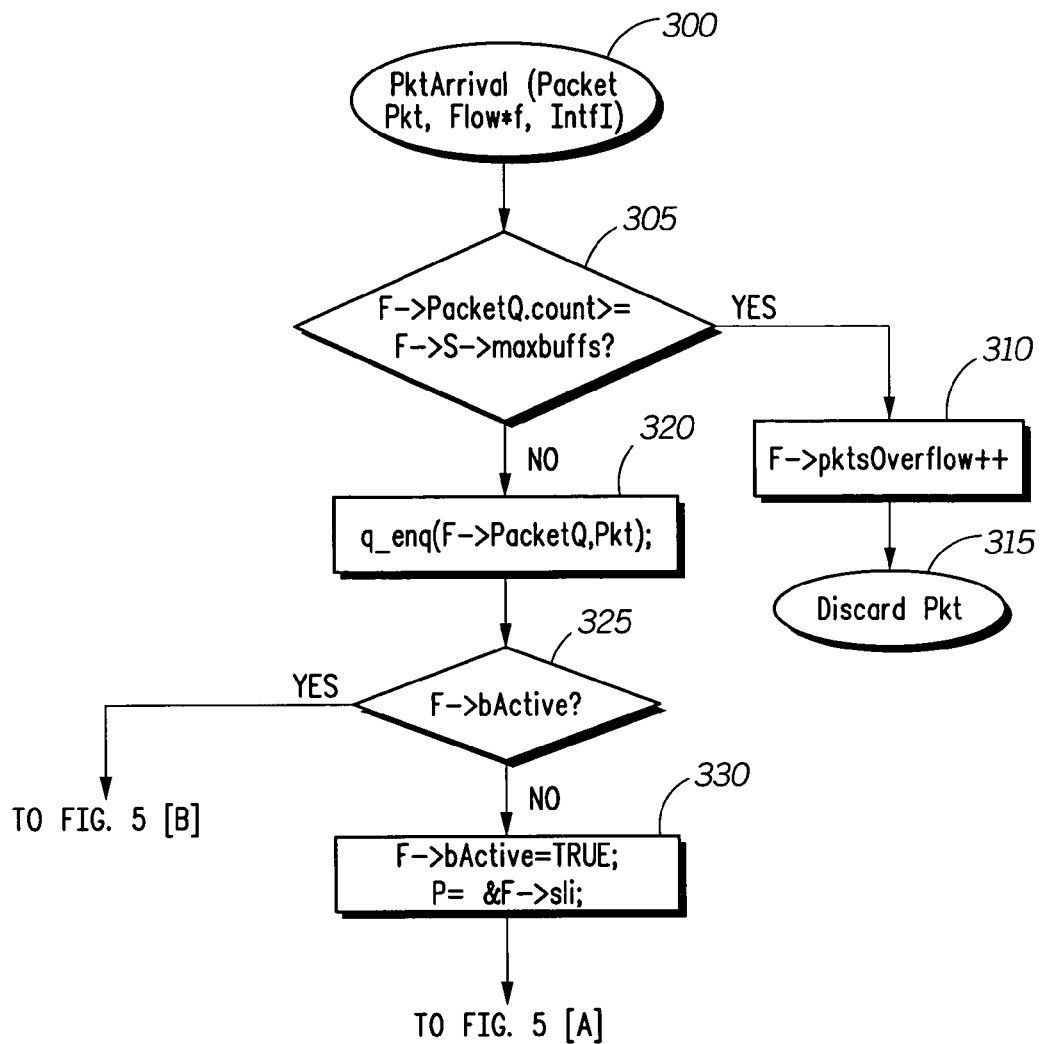
FIGS. 4 and 5 are flow charts of the operation of the process of receiving a new packet according to the system and method of FIG. 1.
Figure 5:
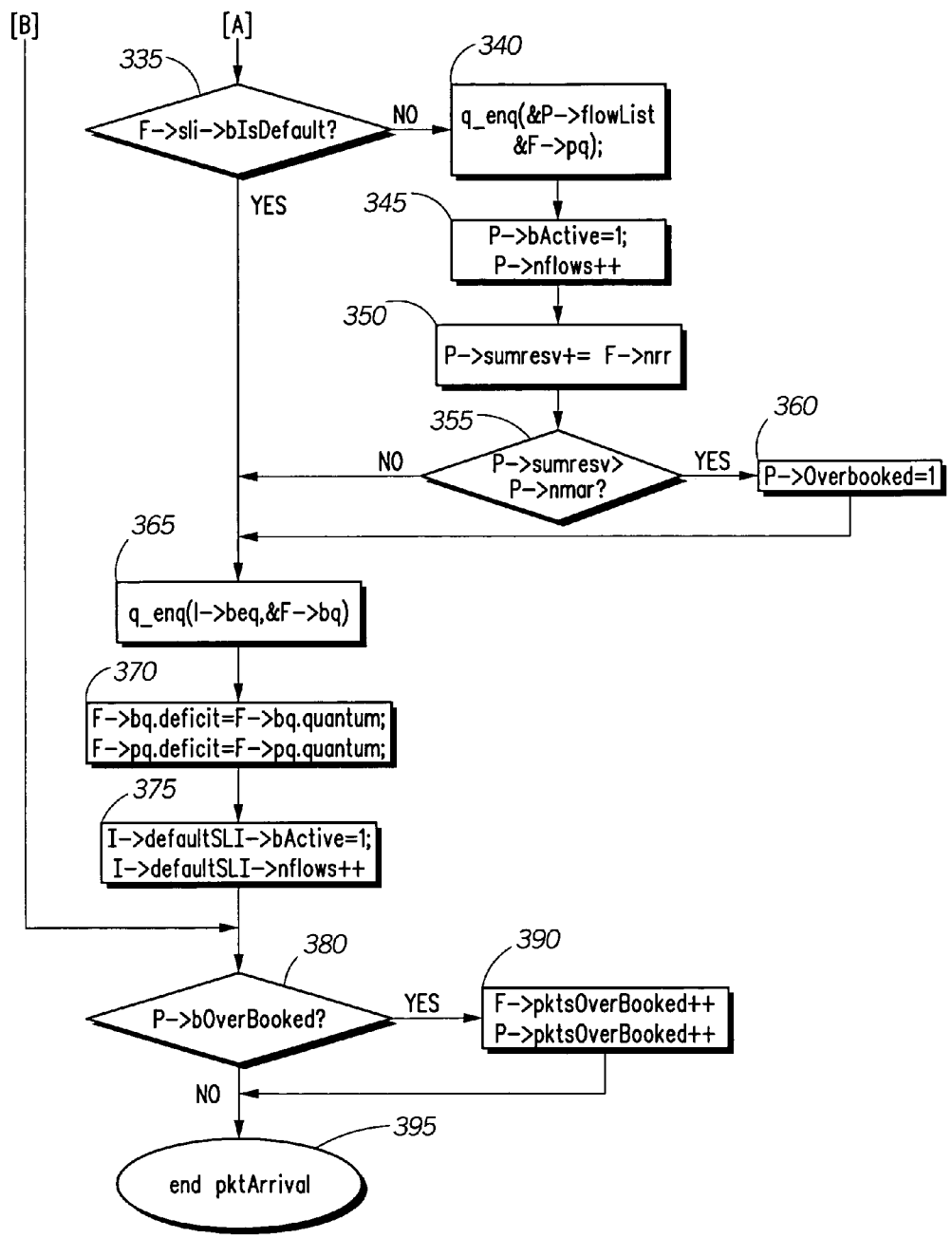
Figure 6:
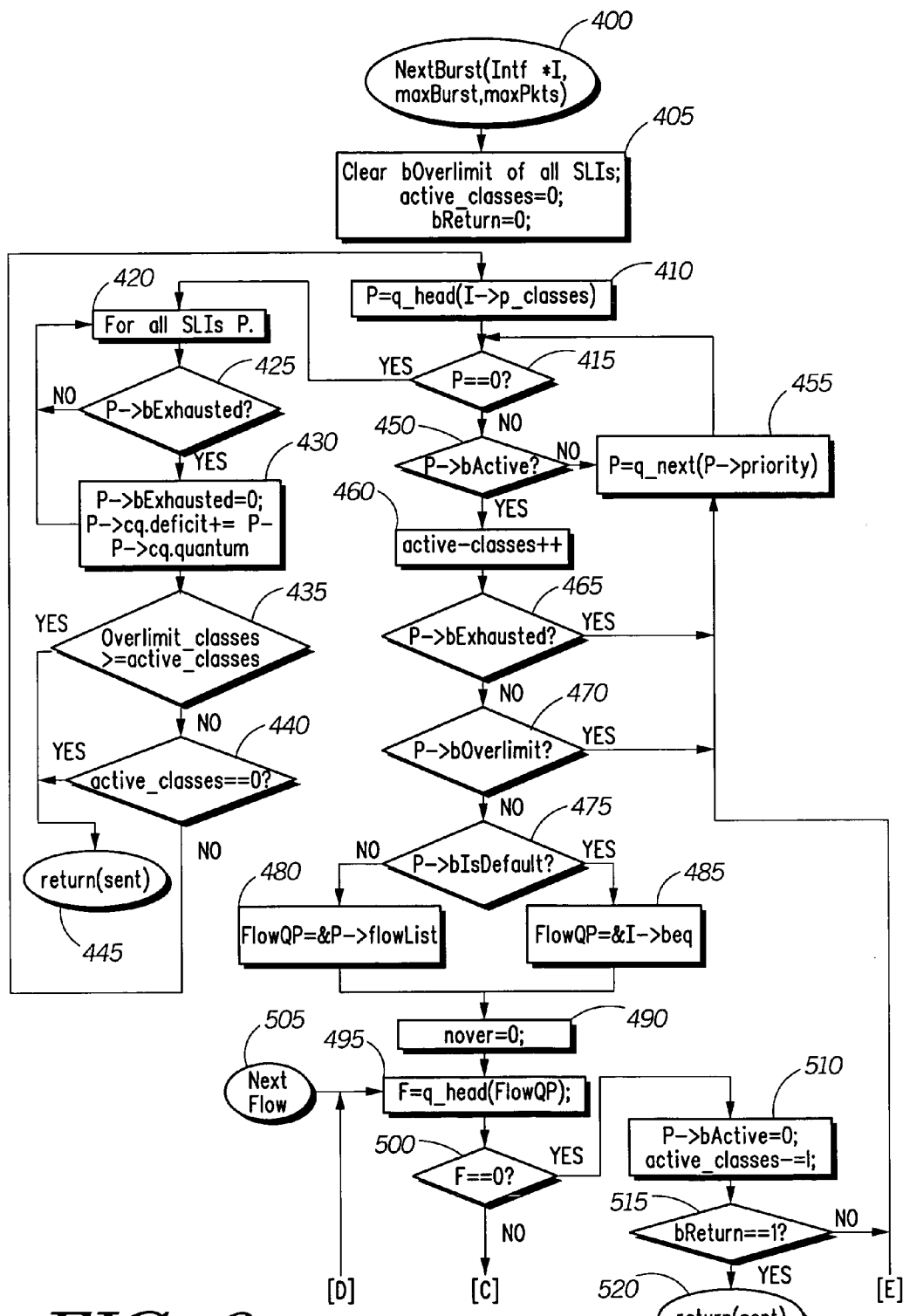
FIGS. 6, 7, 8, 9 and 10 are flow charts of the scheduling of packets to be transmitted according to the system and method of FIG. 1.

FIGS. 4 and 5 show the operation of a procedure to process the arrival of a new packet to the scheduling method of the present invention. The steps in FIG. 4 are expressed in terms of statements in the C computer language using fields as described in FIG. 2, however the invention is not limited to this computer language.

Referring now to FIG. 4, when the data communication device processes the arrival of a packet to the scheduler of an interface, it invokes a procedure PktArrival( ), step 300.

Pkt is the packet to be sent which comprises a pointer and length of the packet.

F is a pointer to the FLOW structure to which the packet has been classified.

I is a pointer to the INTF structure on which the packet has been routed to be sent.

At step 305, the method checks if the number of enqueued packets on Flow F's Packet exceeds the maximum number of buffers permitted for Flow F's Service Class. If so, a statistic is incremented 310 and the packet is discarded step 315.

Otherwise, at step 320, the newly arrived packet is enqueued on Flow F's PacketQ Queue. The q_enq( ) function of this method takes as its second argument a pointer to a QITEM. In the case of step 320, the Pkt structure is assumed to have as its first element a QITEM.

At step 325, the bActive boolean of Flow F is checked. If the flow is already marked as active, no further processing is required at packet arrival, and processing skips to step 380 (in FIG. 5). Otherwise, the flow needs to be made active and inserted into the data structures similar to FIG. 3, step 330.

Referring now to FIG. 5, at step 335, the flow is checked to see if it belongs to the default Service Class. If not, the method proceeds to step 340, where flow is enqueued upon the flowlist QUEUE of its (non-default, prioritized) SLI. The QITEM within the "pq" DRRITEM of the flow is used to link the Flows of the same SLI together. The prioritized SLI is also marked active, step 345, and the count of active flows (the nflows field of the SLI structure 170) is incremented.

In steps 350, 355, and 360 following 345, the method checks if the newly activating flow initiates an "overbooked" condition of the service class. Each flow has associated with a "normalized reserved rate" (nrr) which is in terms of bits per second. This is the bandwidth reserved for the flow. The method permits operators to configure and admit flows that are "overbooked", i.e. the sum of the admitted flows reserved rates exceeds the capacity assigned for the service class. The capacity is assigned per service class on a percentage basis. The bits per second assigned for the service class is stored in the SLI's field "normalized maximum assigned rate" or "nmar". At any given time, the sum of the active flows' reserved rates is stored in the SLI's "sumresv" field, step 350. When this exceeds the assigned rate for the class (nmar), step 355, the SLI is marked as being in an overbooked state, step 360. Operation resumes with step 365.

Whether or not the newly activating flow was placed on the "pq" DRR queue, processing proceeds with step 365, at which point the flow is also enqueued on the "best effort" flow queue headed by Intf I's "beq" QUEUE structure. The QITEM within the "bq" DRRITEM of the flow is used to link the flows on the "best effort" flow list.

At step 370, the flow starts its place in the current DRR round with its deficit set equal to the flows assigned "quantum". In this embodiment, all flows in the "bq" (best effort queue) and the "pq" (priority queue) are considered to have the same quantum. For example, a reasonable quantum would be 512 bytes. The quantum should be selected to be less than the maximum Ethernet packet size (1500 bytes), but not too much less, so that an excessive number of DRR "rounds" are not required in order to increment the deficit to the size of the packet. Note that flow in prioritized SLIs are considered to be in two different DRR "queues", their own classes prioritized queue (linked via "pq") and the best effort DRR queue (linked via "bq"). The deficit for both DR queues is initialized.

At step 375, the default SLI is marked as active because a flow has been added to the best effort flow list. The count of active flows on default SLI is incremented.

At step 380, the flow is checked if it is in an "overbooked" state. A flow is in the overbooked state when it becomes active and there are already other active flows in the flows service class whose reserved rates exceed the assigned capacity of the link for that service class. The method of this invention is unique in that it maintains such an "overbooked" state of flows and counts the arrivals of packets in an overbooked state.

A packet that arrives to find that the service class is in an overbooked condition causes the count of "overbooked packet arrivals" to be incremented in step 390.

Step 395 terminates the Packet Arrival processing.

The flow to which the packet was classified is now inserted in the data structure exemplified in FIG. 3.

FIGS. 6, 7, 8, 9 and 10 show the scheduling method of the next "burst" of packets or bytes to be sent. The NextBurst operation is invoked when a data communication transmitter has completed sending one or more packets and is requesting the scheduler to select the next packet or group of packets. The algorithm is expressed such that the caller of NextBurst may specify a maximum number of bytes to be transmitted (maxBurst) or a maximum number of packets to be sent (maxPkts). These two parameters, along with a pointer to the INTF interface structure on which the next burst is to be sent, form the parameters to the NextBurst operation 400.

The NextBurst routine has a number of local variables:

active_classes is a count of the number of SLIs that are active.

overlimit_classes is a count of the number of SLIs that are "overlimit". An overlimit SLI is one in which all flows are "overlimit". An overlimit flow is one which has exceeded its traffic token bucket. The traffic token bucket measures whether a flow has exceed its reserved minimum rate.

nover is a count of the number of overlimit flows within a particular service class.

bReturn is a control flag that becomes TRUE (i.e. set to 1) when the method determines that the NextBurst routine should return.

P is a pointer to the current SLI structure which is offered bandwidth.

F is a pointer to the current flow (within P) that is offered bandwidth.

Pkt is a pointer to the current packet of F that is being examined.

In step 405, the method initializes the local variables and scans through all SLI's (via the p_classes QUEUE within the INTF) and sets the bOverlimit bit of the class to 0 (i.e. FALSE).

Step 410 begins the next DRR round of the "priority DRR queue". It sets the local SLI pointer P to the head of the INTF's p_classes queue. Note that the "q_head (QUEUE)" operation returns the pointer to the head of a queue, but does not remove it from the queue.

Step 415 checks if all classes have been offered bandwidth in the current priority class DRR round. If so, the P pointer will be zero, and the next Class DRR round is started with the step 420. In this step, step 425 is executed for each class in the interface (i.e. all SLIs linked via the P-classes QUEUE of the INTF structure with bExhausted=1. This means they have exhausted their class DRR deficit. Their deficit is increased by the appropriate quantum in step 430, and the bExhausted flag is cleared to ready the SLI for the next Class DRR round.

The just-completed round, the number of "overlimit" classes had been accumulated in the local counter "overlimit_classes". These are classes which must wait until a later call to NextBurst in order to have any of their flows eligible for forward a packet. In step 435, this overlimit_classes count is compared with the number of active classes; if all classes are overlimit, then NextBurst cannot forward any packet, and returns with sent=0 in step 445.

In step 440, if the last Class DRR round emptied all of the enqueued packets so that there is no longer any active classes, then NextBurst also returns in step 445. If there are still active classes, however, the new Class DRR round starts by transitioning back to step 410.

Back in step 415, if the current class DRR round is not over, processing continues with step 450. In step 450, if the current SLI is not marked as active, that means it has no flows that are active, and can be skipped. In this case, the method goes to step 455 to get the next lower priority SLI on the interface's p_classes queue and then transitions back to step 415.

If the current SLI (addressed by P) is active, the method transitions to step 450 where the number of active_classes is incremented by one.

In the subsequent step 460, the SLI is checked to see if it has exhausted its deficit in the current priority DRR round. The P→bExhausted flag is used for this purpose. If so, this SLI cannot receive bandwidth in the current priority DRR round, and the next SLI must be checked in step 455.

Otherwise, the method continues with step 470, where the bOverlimit flag of the current SLI is checked. This flag is set when all flows of the SLI are also overlimit. In this case, bandwidth is not offered to a priority SLI, and the next SLI must be checked via step 455.

Otherwise, the method continues with steps 475, 480, and 485, where the local variable "FlowQP" is set depending on whether the current class is the "default" class or not. If the current CLI (P) is the default, then the relevant queue of flows to be offered bandwidth is the I→beq "best effort" queue of flows. If the current CLI (P) is a priority queue, then the only eligible flows are those linked form the CLI's flowList queue. FlowQP is set to point to the appropriate QUEUE structure.

In either case, the method continues with step 490, where the number of overlimit flows in the current class (nover) is initialized to zero.

Step 495 marks a common processing point to offer bandwidth to the "Next Flow" of the current service class. The off-sheet connector object "505" labeled "Next Flow" is referenced from FIG. 6. In step 495, the local pointer F is set to the head of the FlowQP queue (but the flow is not dequeued).

The method next checks in step 500 whether all flows of the current SLI have been emptied of their packets, i.e. whether F is null. If not, then the method continues with step 525 in FIG. 7.

If in step 500 it was determined that all flows of a given service class have been exhausted (i.e. F==0), then the service class is marked as inactive in step 510 and the total number of active service classes is decremented. In step 515, the method checks the bReturn flag, which is set in step 795 when the current invocation of the NextBurst method has sent the desired maximum number of packets. If so, the NextBurst method terminates in step 520. Otherwise, processing of the next service class continues with step 455.

In step 525, the method checks whether all of the flows in the current service class are overlimit. If so, the method transitions to step 530 where the class itself is marked as overlimit and the number of overlimit classes detected for this invocation of the NextBurst method transitions to step 455 to check the next service class.

If the class itself is not overlimit, the method transitions from 525 to 535. This starts the "Next Packet" processing of the next packet on the current flow. The local pointer Pkt is set to the head of the current flow's packet queue (PacketQ), but the packet itself is not yet removed from the queue.

In the following step 545, the Pkt pointer is checked. If it is NULL, then all packets in the current flow have been sent, and the method transitions to step 585. Step 585 updates statistics and the data structures of FIG. 2 for the case when a flow becomes inactive. The flow is removed from both the priority DRR queue (i.e. the SLI flowlist QUEUE) as well as the best effort DRR queue (from INTF's "beq" QUEUE). Step 585 also decrements a count of the sum of the reserved rates of all active flows in the class, the "P→sumresv" count. In step 590, if P→sumresv drops below the "normalized maximum assigned rate" (P→nmar), then the class is no longer considered to be in an Overbooked state. The P→Overbooked flag is cleared in step 595 if this is the case. In either case after the check in step 590, the method continues with the next flow in the current SLI at step 495.

Back in step 545, if the current Pkt pointer is not null, the method transitions to step 550. In this step, the bReturn flag is checked in case it had been set by step 765, in which case the method returns in step 560. If the bReturn flag is not yet set, processing continues with step 555.

Step 555 checks if sending the packet would cause the NextBurst routine to have exceeded the maximum number of bytes permitted in the NextBurst routine call. The current running total of bytes sent is kept in the "sent" local variable. In this case, NextBurst returns in step 560 without sending the current packet.

If 555 did not detect that the maximum burst per routine call was exceeded, the method continues with step 565, where the priority DRR queue "deficit" is checked. If the packet length exceeds the deficit count of the priority "class" DRR item (i.e. P→cq.deficit), then the current class has exhausted its allowed transmission in this priority DRR round. In this case, the service class is marked with bExhausted flag set to 1 (true), and the method proceeds to check the next service class in step 455.

If the service class DRR deficit was not exhausted in 565, however, the method resumes with the step 575, where the maximum rate token bucket for the flow is updated. The procedure to update a token bucket (tokbkt_update( )) adds the appropriate number of tokens to the token bucket count based on the number of CPU processor ticks that have elapsed since its last update. Each "token" in a token bucket gives the right to transmit one byte.

In step 580, the method compares the packet length with the number of tokens in the just-updated max rate token bucket (F→maxBkt). If there are insufficient tokens, the method transitions to step 600. Here, the method increments a count of such "overMaximum" packet scheduling attempts and increments the number of "overlimit" flows in the current service class (the local variable "nover"). At step 605, the operation "MoveFlowToEnd( )" is invoked to move the overlimit flow to the end of its current Flow queue. The flow will not be permitted to send packets until a subsequent call to NextBurst at which time sufficient time may have elapsed to add more tokens to its max rate token bucket. The method transitions from 605 to handle the next flow in the current class at step 495.

Figure 8:
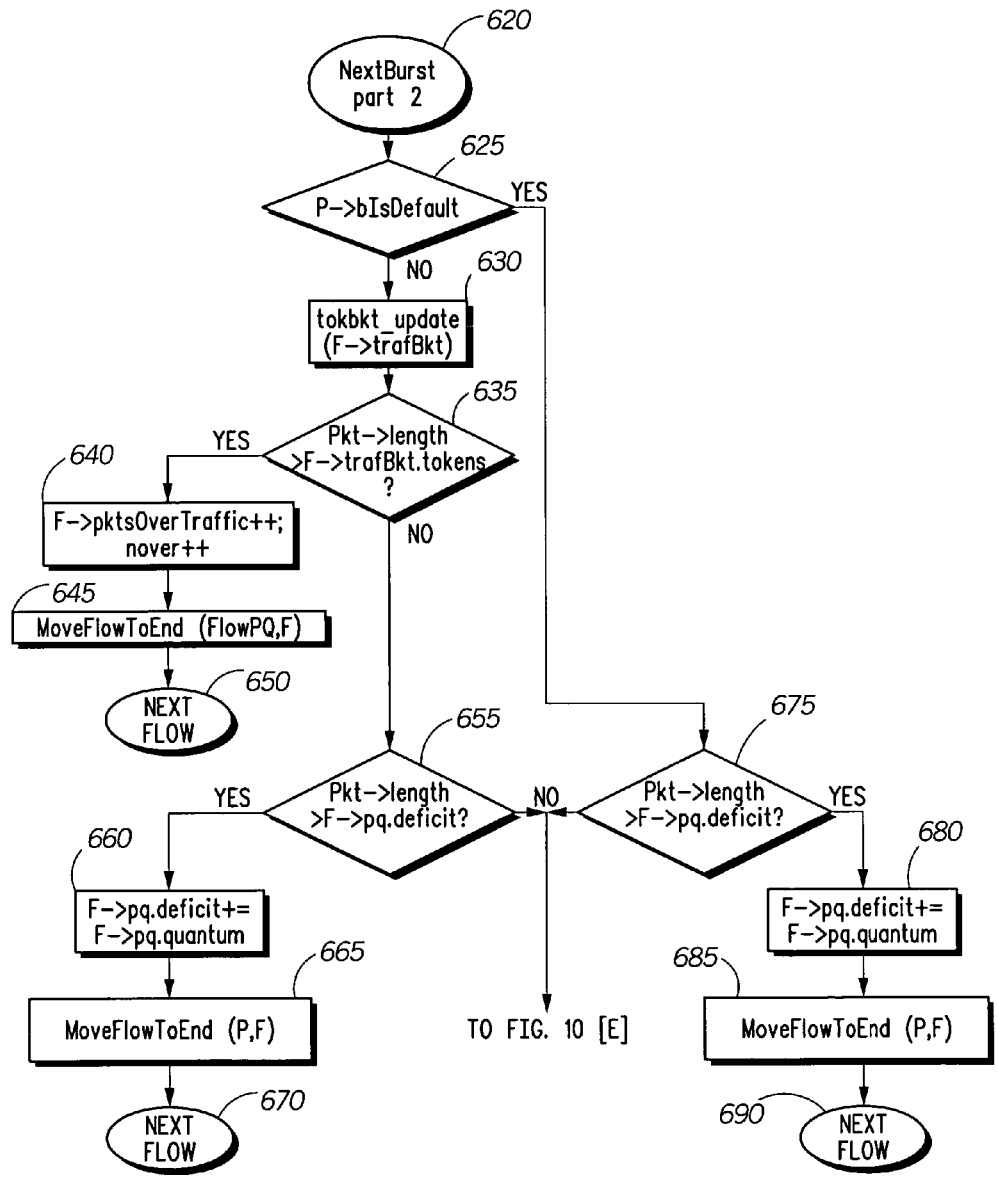
Figure 9:
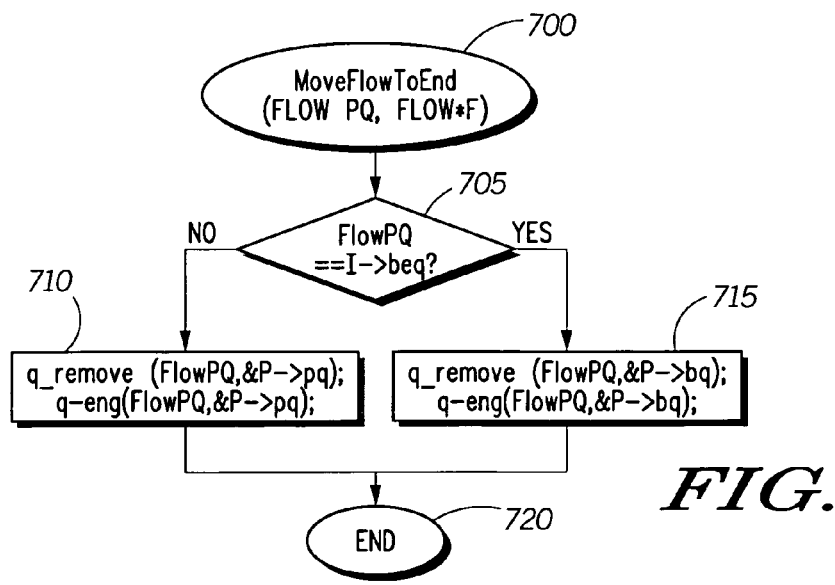

If the method passes the maximum rate token bucket limiter in step 580, it continues with step 610, which is a connector to the continuation of the NextBurst procedure in FIGS. 8 and 9.

Figure 7:
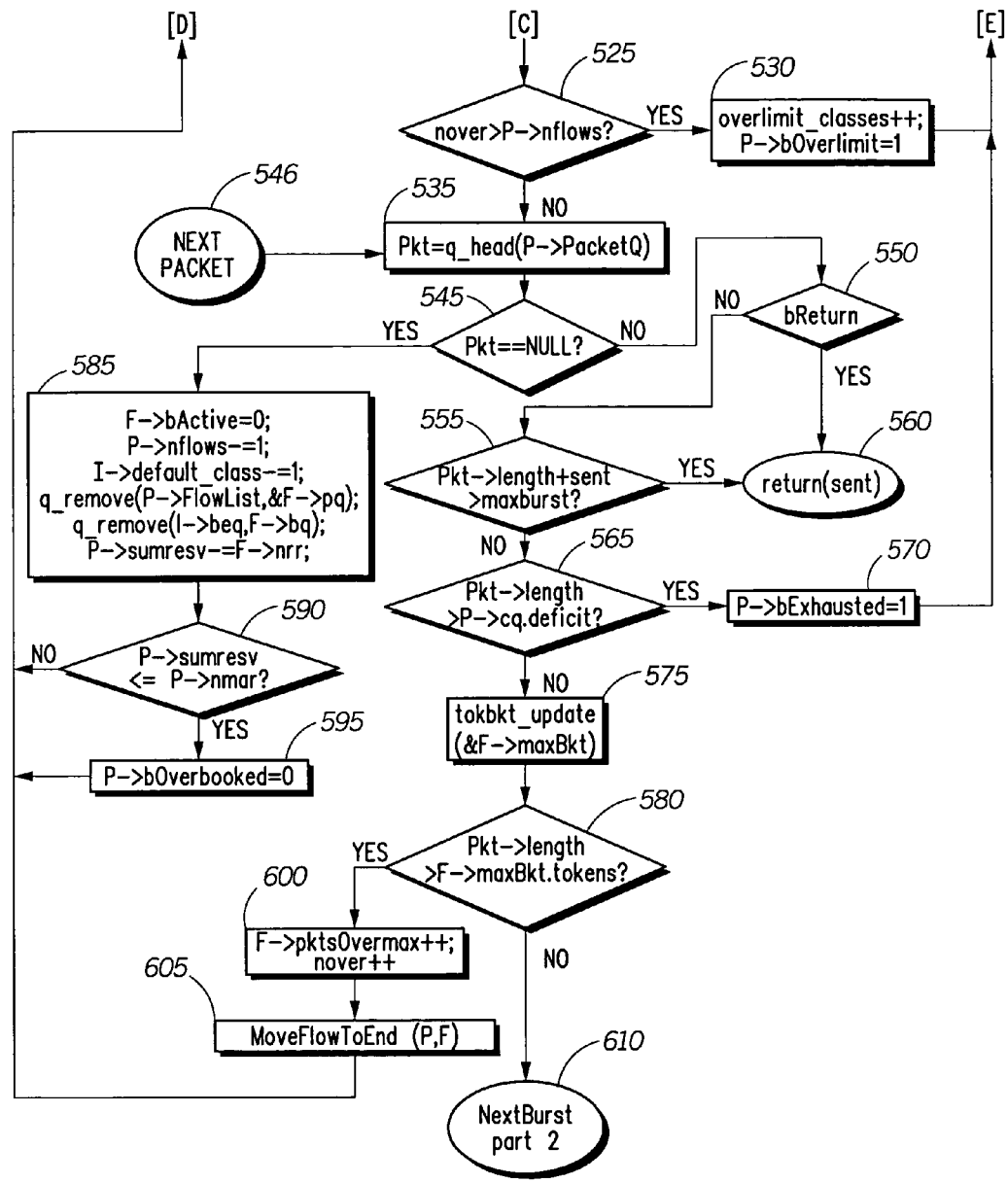

Step 620 is the continuation of the NextBurst procedure from FIG. 7.

Step 625 checks if the current class being offered bandwidth is the default class. If not, step 630 updates the reserved rate "traffic" token bucket for the flow (F→trafBkt) and step 635 checks if the flow is currently "under" its reserved rate. If not, the method at step 640 marks the packet as over its traffic rate and moves the flow to the end of its priority DRR list in step 645, invoking the MoveFlowToEnd( ) sub-method as described in steps 700-720. The flow is not permitted to send traffic that exceeds its traffic rate token bucket in bandwidth that is offered to its prioritized service class. It may only send when bandwidth is offered to the default service class. After moving the flow to the end of its CLI's flowList, step 650 transitions to step 495 to process the next flow in the current class.

If step 635 determined that the flow is not over its reserved traffic rate limit, then it transitions to step 655. This step checks if the current packet for the flow would exceed the deficit for the per-flow DRR round, i.e. F→pq.deficit. If so, the routine transitions to step 660 because the flow must wait until the next per-flow DRR round. In step 660, the flow's "pq" DRR item deficit is increased by the quantum. In step 665, the MoveFlowToEnd sub-method is invoked to move the flow from the front to the rear of the current class's flowlist, and processing continues with the next flow at step 495.

If in step 625 the current class being offered bandwidth was indeed the default class, the method continues to step 675. Steps 675 through 690 are analagous to the method used for non-default class. Step 675 compares the packet's length to the flow's deficit on the Best Effort DRR list (F→bq.deficit). If the packet length is less than the flow's deficit, the method continues with step 725. If the next packet's length exceeds the Best Effort DRR deficit, however, the method continues with step 680. In step 680, the flow's Best Effort DRR deficit is increased by the flow's Best Effort DRR quantum (F→bq.quantum). In step 685, the flow is moved to the end of the class's flow list by invoking the MoveFlowToEnd method as described in steps 700-720. After step 685, the method transitions in step 690 to return via the "Next Flow" label 505 to process the next flow in step 495.

Step 700 is the start of the MoveFlowToEnd sub-method invoked by steps 605, 645, 665, and 685 above. The MoveFlowToEnd method is invoked for a particular DRR queue FlowPQ and for a particular Flow F. Remember that a flow may be a member of two different DRR queues, and as such has two different DRRITEMs (160), F→pq and F→bq. The MoveFlowToEnd method simply selects the proper DRRITEM to be modified. In step 705, the DRR queue pointer FlowPQ is checked to see if it is the Best Effort queue. If so, the method transitions to step 715 where the Flow is first dequeued from the start of the best effort DRR queue (q_remove(FlowPQ,&P→bq)), and then re-enqueued to the tail of that DRR queue (q_enq(FlowPQ,&P→bq)). The MoveFlowtoEnd sub-method then terminates in step 720. If Step 705 determined that the Priority DRR queue is being modified instead of the Best Effort DRR queue, then the method transitions to step 710 where the flow is first removed from the head of the priority DRR queue and then re-enqueued to the tail.

Figure 10:
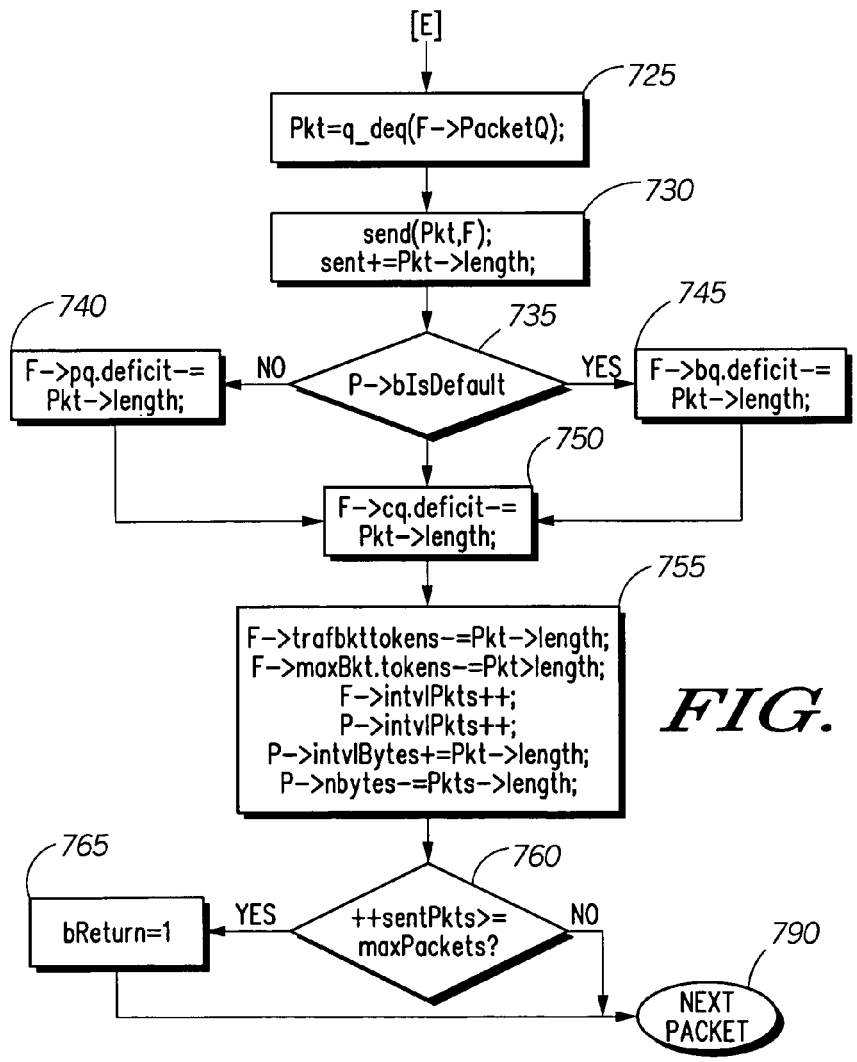

Referring now to FIG. 10 of the NextBurst method, if step 655 or step 675 determines that the flow does have enough deficit in the current flow DRR round to send the current packet, then control transitions to step 725 (of FIG. 9). The packet is actually dequeued from the head of the Flows Packet queue in step 725.

Step 730 invokes the operation "send( )" to actually send the packet onto the transmission link. The local variable "sent" accumulates the number of bytes sent via the "send( )" operation.

Steps 735, 740, 745, and 750 update the appropriate flow DRR queue by decrementing the just-sent packet length from the "deficit" count of the appropriate DRRITEM. For the default class, this is F→bq (Step 740); for the non-default classes, this is F→pq. In either case, processing resumes with step 750, where the DRR deficit for the class-level DRR queue (P→cq) is decremented by the packet length.

In step 755, a number of statistics are updated. The Flow's traffic rate and max rate token buckets have one token removed for each byte transmitted. A count of packets and bytes in a current statistics gathering interval are incremented, for both per-Flow and per-class statistics.

Step 760 increments a count of packets sent in this invocation of NextBurst (sentPkts). If it is lower than the maximum number of packets requested to be sent (the parameter maxpackets), then processing resumes with the next packet in the current flow, which is indicated via the "NextPacket" connector to step 535. If the maxPackets count has been reached, a control flag "bReturn" is set TRUE, step 765. Operation of the method then returns to step 540 with consideration of the next packet. The "bReturn" flag set in step 765 is examined after the method appropriately updates the data structures of FIG. 2 for the case when the just-sent packet was the last packet of an active service class.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for scheduling the transmission of packets onto a data communications link, comprising the steps of:
   a) receiving a plurality of packets of a data flow;
   b) configuring said flow to a service class;
   c) scheduling transmission bandwidth of said service class to a selected limit;
   d) forwarding packets of said flow that conform to said selected limit;
   e) identifying a default class having a default class bandwidth; and
   f) forwarding packets using both the bandwidth allocated to the service class and the bandwidth allocated to the default class.

2. A method for selecting among a plurality of prioritized packet queues for a next packet for transmission in a network, comprising the steps of:
   a) assigning to each queue in the plurality of prioritized packet queues a quantum of allocated bandwidth of a shared bandwidth;
   b) assigning to each queue in the plurality of prioritized packet queues a deficit representing a permitted amount of data to be forwarded by said queue;
   c) selecting a next packet for transmission from a queue having a high priority and a deficit value that exceeds the size of said next packet;
   d) reducing the deficit of the queue selected in step c by the size of said selected next packet; and
   e) if all backlogged queues in said plurality of prioritized packet queues have insufficient deficit to forward a next packet, adding the value of the quantum to the deficit in each said backlogged queue, whereby a new round of selection from among the set of prioritized packet queues is started.

3. The method of claim 2 further comprising the step of
   f) if all queues are empty, adding the value of the deficit to the value of the quantum in each said empty queue, whereby a new round of selection from the set of prioritized packet queues is started.

* * * * *

UNITED STATES PATENT AND TRADEMARK OFFICE
CERTIFICATE OF CORRECTION

PATENT NO. : 7,457,313 B2
APPLICATION NO. : 11/013226
DATED : November 25, 2008
INVENTOR(S) : Michael W. Patrick It is certified that error appears in the above-identified patent and that said Letters Patent is hereby corrected as shown below:

FIGURE 2, Sheet 2 of 9, for Tag "130", Line 1: Please delete "SLIFONF" and replace with --SLICONF--

COLUMN 14:
Line 67: Please delete "analagous" and replace with --analogous--

COLUMN 16:
Line 1: Please delete "maxpackets" and replace with --maxPackets--

Signed and Sealed this

Twenty-fifth Day of August, 2009

David J. Kappos
*Director of the United States Patent and Trademark Office*